United States Patent
Chokshi

(10) Patent No.: US 12,243,179 B2
(45) Date of Patent: Mar. 4, 2025

(54) INTERACTIVE DIGITAL ADVERTISING WITHIN A VIRTUAL EXPERIENCE

(71) Applicant: Roblox Corporation, San Mateo, CA (US)

(72) Inventor: Palak Chokshi, San Ramon, CA (US)

(73) Assignee: Roblox Corporation, San Mateo, CA (US)

( * ) Notice: Subject to any disclaimer, the term of this patent is extended or adjusted under 35 U.S.C. 154(b) by 157 days.

(21) Appl. No.: 17/865,746

(22) Filed: Jul. 15, 2022

(65) Prior Publication Data
US 2024/0020936 A1 Jan. 18, 2024

(51) Int. Cl.
| | |
|---|---|
| G06T 19/00 | (2011.01) |
| G06Q 20/36 | (2012.01) |
| G06Q 30/0601 | (2023.01) |
| G06T 19/20 | (2011.01) |
| G06V 20/64 | (2022.01) |
| G06F 3/0482 | (2013.01) |

(52) U.S. Cl.
CPC ............ *G06T 19/20* (2013.01); *G06Q 20/36* (2013.01); *G06Q 30/0643* (2013.01); *G06V 20/64* (2022.01); *G06F 3/0482* (2013.01); *G06T 2200/24* (2013.01); *G06T 2210/16* (2013.01); *G06T 2219/2012* (2013.01)

(58) Field of Classification Search
CPC . G06T 19/20; G06T 2200/24; G06T 2210/16; G06T 2219/2012; G06V 20/64; G06Q 20/36; G06Q 30/0643; G06F 3/0482
See application file for complete search history.

(56) References Cited

U.S. PATENT DOCUMENTS

| | | | | |
|---|---|---|---|---|
| 2010/0211900 | A1* | 8/2010 | Fujioka | G06Q 30/0603 705/347 |
| 2011/0078055 | A1* | 3/2011 | Faribault | G06Q 30/0643 705/27.2 |
| 2012/0264570 | A1* | 10/2012 | Watterson | G16H 80/00 482/8 |
| 2018/0091732 | A1* | 3/2018 | Wilson | H04N 23/611 |
| 2020/0349536 | A1* | 11/2020 | Hertel | G06Q 20/384 |

OTHER PUBLICATIONS

Screen captures from YouTube video clip entitled "Avatar Customization Tutorial" 2 pgs, uploaded on Apr. 9, 2020 by "Sinespace". Retrieved from Internet :<https://www.youtube.com/watch?v=uOLKOyJqglc> (Year: 2020).*

\* cited by examiner

*Primary Examiner* — Terrell M Robinson
(74) *Attorney, Agent, or Firm* — IP Spring

(57) ABSTRACT

Some implementations relate to methods, systems, and computer-readable media for digital advertising. In some implementations, a computer-implemented method includes presenting virtual items at a virtual user engagement station. The virtual user engagement station may include a threshold radius for activation of a change in configuration. Upon an avatar crossing the threshold radius, the avatar may be allowed to temporarily wear or interact with the presented virtual items, display different virtual items, and/or purchase virtual items.

20 Claims, 9 Drawing Sheets

INTERACTIVE DIGITAL ADVERTISING WITHIN A VIRTUAL EXPERIENCE

TECHNICAL FIELD

Embodiments relate generally to online virtual experience platforms, and more particularly, to methods, systems, and computer readable media for interactive digital advertising within virtual experiences.

BACKGROUND

Online platforms, such as virtual experience platforms and online gaming platforms, can sometimes include marketplaces or other virtual environments where users can purchase virtual items. However, it can be difficult to create enriching three-dimensional (3D) advertisements for user-generated content. For example, user-generated content on many platforms is accessed through search engines and other existing, intuitive functionality. As many users are already engaging with existing functions for finding content, many users may ignore digital advertisements altogether. Example embodiments are presented herein that overcome these and other drawbacks.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Aspects of this disclosure are directed to methods, systems, and computer readable media to provide digital advertisements in virtual experiences.

According to one aspect, a computer-implemented method of digital advertising within a virtual experience provided by a virtual experience platform is described, the method comprising: receiving virtual experience content associated with a virtual experience, the received virtual experience content including at least one virtual item that is useable to alter an appearance of an avatar within the virtual experience; presenting the received virtual experience content within the virtual experience in a virtual user engagement station, the virtual user engagement station having a base virtual member configured to display the at least one virtual item and a threshold radius defined from the base virtual member extending radially outward within the virtual experience; receiving indication that a first avatar associated with a first user identifier (ID) is within the threshold radius; altering an appearance of the virtual user engagement station responsive to the received indication; after the altering, receiving a request from the first user ID to engage with the at least one virtual item; and responsive to receiving the request, displaying the at least one virtual item as being worn by the first avatar associated with the first user ID.

Various implementations of the computer-implemented method are described.

According to one implementation, presenting the received virtual experience content comprises: selecting a virtual item from the received virtual experience content as the at least one virtual item based upon a classification, a rating, or subject matter of the virtual experience.

According to one implementation, presenting the received virtual experience content comprises: selecting a virtual item from the received virtual experience content as the at least one virtual item based upon user data associated with the first user ID.

According to one implementation, the received virtual experience content is associated with a second user ID of the virtual experience platform, the method further comprising: after displaying the at least one virtual item as being worn by the first avatar, receiving a purchase request from the first user ID for the at least one virtual item; and in response to receiving the purchase request, transferring a digital token from a first digital wallet associated with the first user ID to a second digital wallet associated with the second user ID.

According to one implementation, the digital token is a digital representation of a virtual currency amount associated with the at least one virtual item, and wherein the virtual currency amount is shown during the displaying the received virtual experience content.

According to one implementation, the virtual user engagement station comprises at least two configurations, wherein a first configuration comprises a beacon emanating from the base virtual member, and wherein the second configuration is the altered appearance.

According to one implementation, displaying the at least one virtual item comprises: temporarily displaying the at least one virtual item as being worn by the first avatar associated with the first user ID for a time frame that is dependent upon defined settings.

According to one implementation, the at least one virtual item is a first virtual item of a plurality of virtual items, and wherein displaying the received virtual experience content comprises: presenting one virtual item of the plurality of virtual items above the virtual base member; presenting a selection option proximate to the virtual base member; and responsive to the first virtual avatar engaging with the selection option, presenting a different virtual item of the plurality of virtual items above the virtual base member.

According to one implementation, the computer-implemented method further comprising: receiving a second request to engage with the different virtual item; and altering the appearance of the first virtual avatar with the different virtual item responsive to receiving the second request.

According to one implementation, the at least one virtual item is a first virtual item of a plurality of virtual items, and wherein displaying the received virtual experience content comprises: presenting at least one virtual item of the plurality of virtual items above the virtual base member for interaction with by the first avatar.

According to one implementation, altering the appearance of the virtual base member comprises one or more of: highlighting the at least one virtual item, highlighting the virtual base member, or displaying the at least one virtual object at the virtual user engagement station.

According to one implementation, receiving the request to engage with the at least one virtual item comprises receiving a selection from a selectable option displayed proximate the virtual base member.

According to one implementation, the at least one virtual item is a piece of virtual clothing, and wherein the displaying comprises displaying the piece of virtual clothing as worn by the first virtual avatar.

According to one implementation, the temporarily presenting comprises displaying at least a portion of the at least one virtual item on the first virtual avatar for one or more of: a predetermined amount of time, or until the first virtual avatar is beyond the threshold radius from the virtual user engagement station.

According to one implementation, the at least one virtual item is: a piece of clothing, a clothing accessory, a neck accessory, a wrist accessory, or shoes.

In another aspect, a non-transitory computer-readable medium is described with instructions stored thereon that, responsive to execution by a processing device, causes the processing device to perform operations comprising: receiving virtual experience content associated with a virtual experience, the received virtual experience content including at least one virtual item that is useable to alter an appearance of an avatar within the virtual experience; presenting the received virtual experience content within the virtual experience in a virtual user engagement station, the virtual user engagement station having a base virtual member configured to display the at least one virtual item and a threshold radius defined from the base virtual member extending radially outward within the virtual experience; receiving indication that a first avatar associated with a first user identifier (ID) is within the threshold radius; altering an appearance of the virtual user engagement station responsive to the received indication; receiving a request to engage with the at least one virtual item responsive to altering the appearance; and temporarily presenting the at least one virtual items as being worn by the first avatar associated with the first user ID responsive to receiving the request.

Various implementations of the non-transitory computer-readable medium are described.

According to one implementation, presenting the received virtual experience content comprises: automatically selecting a virtual item from the received virtual experience content as the at least one virtual item based upon a classification, a rating, or subject matter of the virtual experience.

According to one implementation, presenting the received virtual experience content comprises: automatically selecting a virtual item from the received virtual experience content as the at least one virtual item based upon user data associated with the first user ID.

According to one implementation, the received virtual experience content is associated with a second user ID of the virtual experience platform, the method further comprising: receiving a purchase request for the at least one virtual item responsive to the temporarily presenting; and in response to the purchase request, transferring a digital token from a first digital wallet associated with the first user ID to a second digital wallet associated with the second user ID.

In another aspect, a system is described, comprising: a memory with instructions stored thereon; and a processing device, coupled to the memory and operable to access the memory, wherein the instructions when executed by the processing device, cause the processing device to perform operations including: receiving virtual experience content associated with a virtual experience, the received virtual experience content including at least one virtual item that is useable to alter an appearance of an avatar within the virtual experience; presenting the received virtual experience content within the virtual experience in a virtual user engagement station, the virtual user engagement station having a base virtual member configured to display the at least one virtual item and a threshold radius defined from the base virtual member extending radially outward within the virtual experience; receiving indication that a first avatar associated with a first user identifier (ID) is within the threshold radius; altering an appearance of the virtual user engagement station responsive to the received indication; receiving a request to engage with the at least one virtual item responsive to altering the appearance; and temporarily presenting the at least one virtual items as being worn by the first avatar associated with the first user ID responsive to receiving the request.

According to yet another aspect, portions, features, and implementation details of the systems, methods, and non-transitory computer-readable media may be combined to form additional aspects, including some aspects which omit and/or modify some or portions of individual components or features, include additional components or features, and/or other modifications; and all such modifications are within the scope of this disclosure.

DETAILED DESCRIPTION

Figure 1:
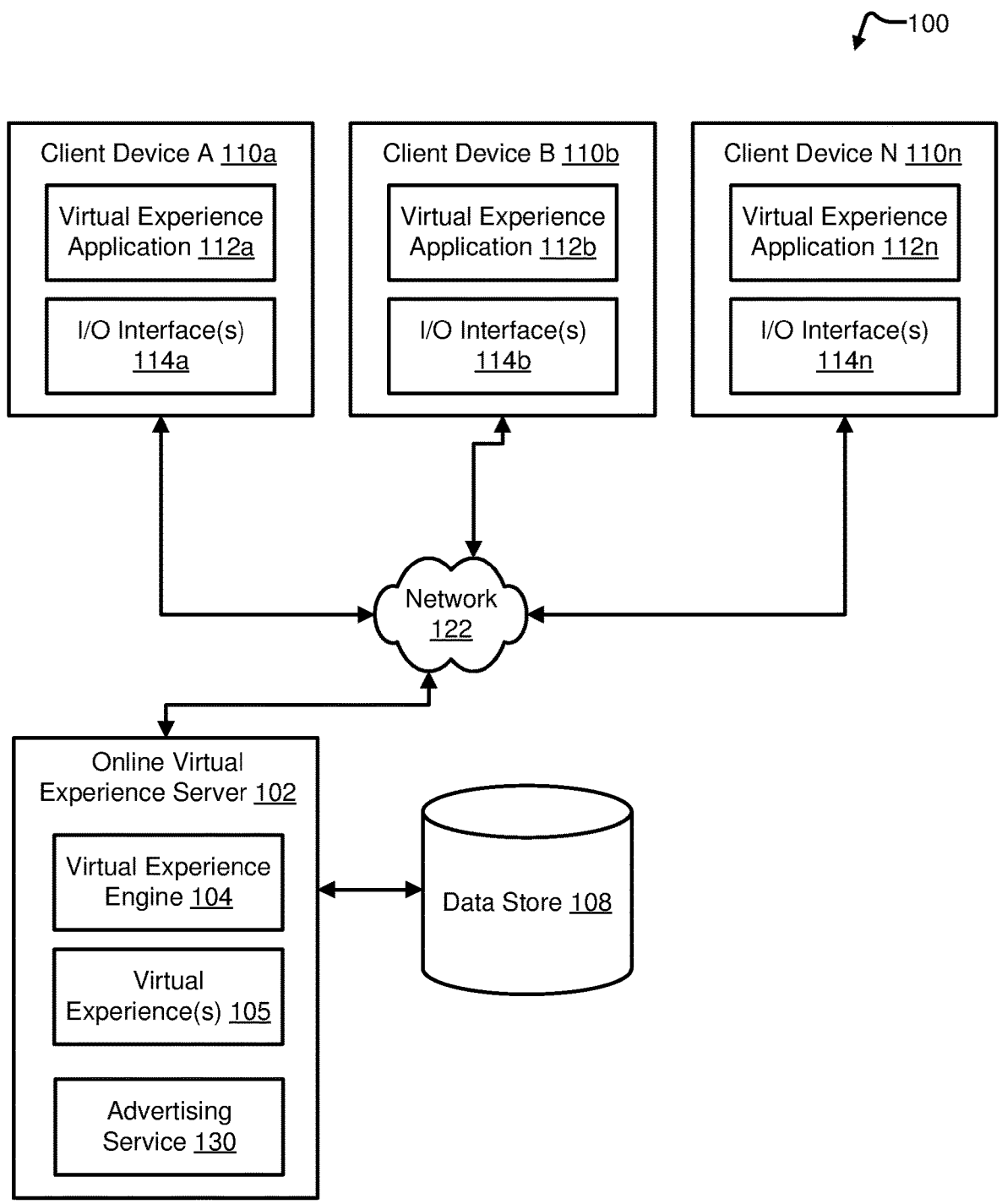
FIG. 1 is a diagram of an example network environment, in accordance with some implementations.

In the following detailed description, reference is made to the accompanying drawings, which form a part hereof In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some implementations", "an implementation", "an example implementation", etc. indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, such feature, structure, or characteristic may be effected in connection with other implementations whether or not explicitly described.

In some aspects, systems and methods are provided for interactive digital advertising within a virtual experience. Online platforms, such as online virtual experience platforms, generally provide an ability to create, store, advertise, and present for purchase virtual items to be used in virtual experiences.

For example, virtual experience platforms may include user-generated content or developer-generated content (each referred to as "UGC" herein). The UGC may be stored and implemented through the virtual experience platform, for example, by allowing users to search and interact with various virtual experiences and associated virtual items. Virtual items may be presented in a search interface or inventory screen, whereby users may peruse virtual items, search for new virtual items, and/or purchase virtual items prior to entering a virtual experience.

While search interfaces and inventory screens allow users to search for items, newly created virtual items, trending virtual items, and other virtual items may not necessarily be surfaced through search alone. For example, a user interested in a particular virtual experience may execute search queries configured to surface items that are based on keywords and/or strings representative of that particular virtual experience.

However, upon interacting with the virtual experience, user interaction data associated with the user's interactions with different content, different avatars, as well as time spent engaged with various other portions of the virtual experience may generate signals that aids in ascertaining the user's interests. Furthermore, some other users may also be in the particular virtual experience and be equipped with virtual items the user may find interesting. These and other contextual data may be used to inform an advertising service of the particular's user's interests, as well as the particular user's contextual data, in a manner that is useful in surfacing different virtual items that may be of interest.

Example embodiments may use user interest data, user contextual data, and/or other user interaction data to inform an advertising service to surface at least one virtual item for interactive advertising to a user's avatar, within a virtual experience. The interactive advertising may be triggered by an avatar's approach towards (or being close to) a virtual user engagement station. Upon the avatar reaching a point within a threshold distance from the virtual user engagement station, the advertising service may direct the virtual user engagement station to alter its appearance to denote and/or display a relevant virtual item for interaction with by the avatar.

The virtual user engagement station may present one or more virtual controls that enable the avatar to engage with, interact with, and/or purchase the virtual item. Additionally, the virtual user engagement station may further present a plurality of virtual items that the avatar may interact with, such as by controlling user interface elements in the virtual experience. The virtual user engagement station may also temporarily allow the avatar to employ, utilize, and/or wear the virtual item prior to any purchase.

According to implementations and embodiments described herein in detail, an online virtual experience platform may deploy an advertising service at a server, and one or more virtual user engagement stations within one or more virtual experiences. The advertising service, by considering user data and developer data, may provide interactive digital advertising of virtual items in an interactive, engaging, and suitable manner depending upon the relevant user data. These and other suitable example embodiments will become apparent in this disclosure.

It is noted that any use of user and/or developer data to determine users' interests, identify matching items, or any other purpose is specifically with permission from the user, in accordance with applicable regulations, and can be turned off by the user. User can also choose what data to permit for such use. User data is stored securely and in compliance with rules and laws. Furthermore, data collection is not performed in certain geo locales, for certain user categories (e.g., based on age or other demographic), is temporary (data are discarded after a period of time), and is stored securely even when only used temporarily. Moreover, user data are not shared with third-parties. Even further, some data may be anonymized, aggregated across users, or otherwise modified so that a specific user identity cannot be determined.

Hereinafter, further details surrounding example embodiments and various aspects of this disclosure are described with reference the many figures.

FIG. 1: System Architecture

FIG. 1 illustrates an example network environment 100, in accordance with some implementations of the disclosure. FIG. 1 and the other figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral (e.g., "110" in the text refers to reference numerals "110a," "110b," and/or "110n" in the figures).

The network environment 100 (also referred to as a "platform" herein) includes an online virtual experience server 102, a data store 108, a client device 110 (or multiple client devices), and a third party server 118, all connected via a network 122.

The online virtual experience server 102 can include, among other things, a virtual experience engine 104, one or more virtual experiences 105, and an advertising service 130. The online virtual experience server 102 may be configured to provide virtual experiences 105 to one or more client devices 110, and to provide interactive digital advertisements via the advertising service 130, in some implementations. Furthermore, as will be described more fully below, the advertising service 130 may also control one or more virtual user engagement stations within virtual experience(s) 105.

Data store 108 is shown coupled to online virtual experience server 102 but in some implementations, can also be provided as part of the online virtual experience server 102. The data store may, in some implementations, be configured to store advertising data, user data, and/or other contextual data in association with the advertising service 130.

The client devices 110 (e.g., 110a, 110b, 110n) can include a virtual experience application 112 (e.g., 112a, 112b, 112n) and an I/O interface 114 (e.g., 114a, 114b, 114n), to interact with the online virtual experience server 102, and to view, for example, graphical user interfaces (GUI) through a computer monitor or display (not illustrated). In some implementations, the client devices 110 may be configured to execute and display virtual experiences, which may include virtual user engagement stations as described herein.

Network environment 100 is provided for illustration. In some implementations, the network environment 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In some implementations, the data store 108 may be a non-transitory computer readable memory (e.g., random access memory), a cache, a drive (e.g., a hard drive), a flash drive, a database system, or another type of component or device capable of storing data. The data store 108 may also include multiple storage components (e.g., multiple drives or multiple databases) that may also span multiple computing devices (e.g., multiple server computers).

In some implementations, the online virtual experience server 102 can include a server having one or more computing devices (e.g., a cloud computing system, a rackmount server, a server computer, cluster of physical servers, virtual server, etc.). In some implementations, a server may be included in the online virtual experience server 102, be an independent system, or be part of another system or platform. In some implementations, the online virtual experience server 102 may be a single server, or any combination a plurality of servers, load balancers, network devices, and other components. The online virtual experience server 102 may also be implemented on physical servers, but may utilize virtualization technology, in some implementations. Other variations of the online virtual experience server 102 are also applicable.

In some implementations, the online virtual experience server 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online virtual experience server 102 and to provide a user (e.g., user 114 via client device 110) with access to online virtual experience server 102.

The online virtual experience server 102 may also include a website (e.g., one or more web pages) or application back-end software that may be used to provide a user with access to content provided by online virtual experience server 102. For example, users (or developers) may access online virtual experience server 102 using the virtual experience application 112 on client device 110, respectively.

In some implementations, online virtual experience server 102 may include digital asset and digital virtual experience generation provisions. For example, the platform may provide administrator interfaces allowing the design, modification, unique tailoring for individuals, and other modification functions. In some implementations, virtual experiences may include two-dimensional (2D) games, three-dimensional (3D) games, virtual reality (VR) games, or augmented reality (AR) games, for example. In some implementations, virtual experience creators and/or developers may search for virtual experiences, combine portions of virtual experiences, tailor virtual experiences for particular activities (e.g., group virtual experiences), and other features provided through the virtual experience server 102.

In some implementations, online virtual experience server 102 or client device 110 may include the virtual experience engine 104 or virtual experience application 112. In some implementations, virtual experience engine 104 may be used for the development or execution of virtual experiences 105. For example, virtual experience engine 104 may include a rendering engine ("renderer") for 2D, 3D, VR, or AR graphics, a physics engine, a collision detection engine (and collision response), sound engine, scripting functionality, haptics engine, artificial intelligence engine, networking functionality, streaming functionality, memory management functionality, threading functionality, scene graph functionality, or video support for cinematics, among other features. The components of the virtual experience engine 104 may generate commands that help compute and render the virtual experience (e.g., rendering commands, collision commands, physics commands, etc.).

The online virtual experience server 102 using virtual experience engine 104 may perform some or all the virtual experience engine functions (e.g., generate physics commands, rendering commands, etc.), or offload some or all the virtual experience engine functions to virtual experience engine 104 of client device 110 (not illustrated). In some implementations, each virtual experience 105 may have a different ratio between the virtual experience engine functions that are performed on the online virtual experience server 102 and the virtual experience engine functions that are performed on the client device 110.

In some implementations, virtual experience instructions may refer to instructions that allow a client device 110 to render gameplay, graphics, and other features of a virtual experience. The instructions may include one or more of user input (e.g., physical object positioning), character position and velocity information, or commands (e.g., physics commands, rendering commands, collision commands, etc.).

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "user device." In some implementations, one or more client devices 110 may connect to the online virtual experience server 102 at any given moment. It may be noted that the number of client devices 110 is provided as illustration, rather than limitation. In some implementations, any number of client devices 110 may be used.

In some implementations, each client device 110 may include an instance of the virtual experience application 112. The virtual experience application 112 may be rendered for interaction at the client device 110. During user interaction within a virtual experience, a user's avatar may approach a virtual user engagement station. Using data related to context, prior user interactions, and prior user engagement with various virtual experiences, the virtual user engagement station may advertise one or more virtual items that may be of interest to the user. While the avatar is in proximity to the virtual user engagement station (e.g., within a threshold radius or distance), the avatar may be temporarily allowed to wear, use, and otherwise "try out" the advertised virtual item(s). Technical effects and benefits of this approach include improved user engagement, reduced use of search tools to locate virtual items, improved revenue for developers of UGC, as well as improved safety in transactions in the virtual metaverse.

Figure 2:
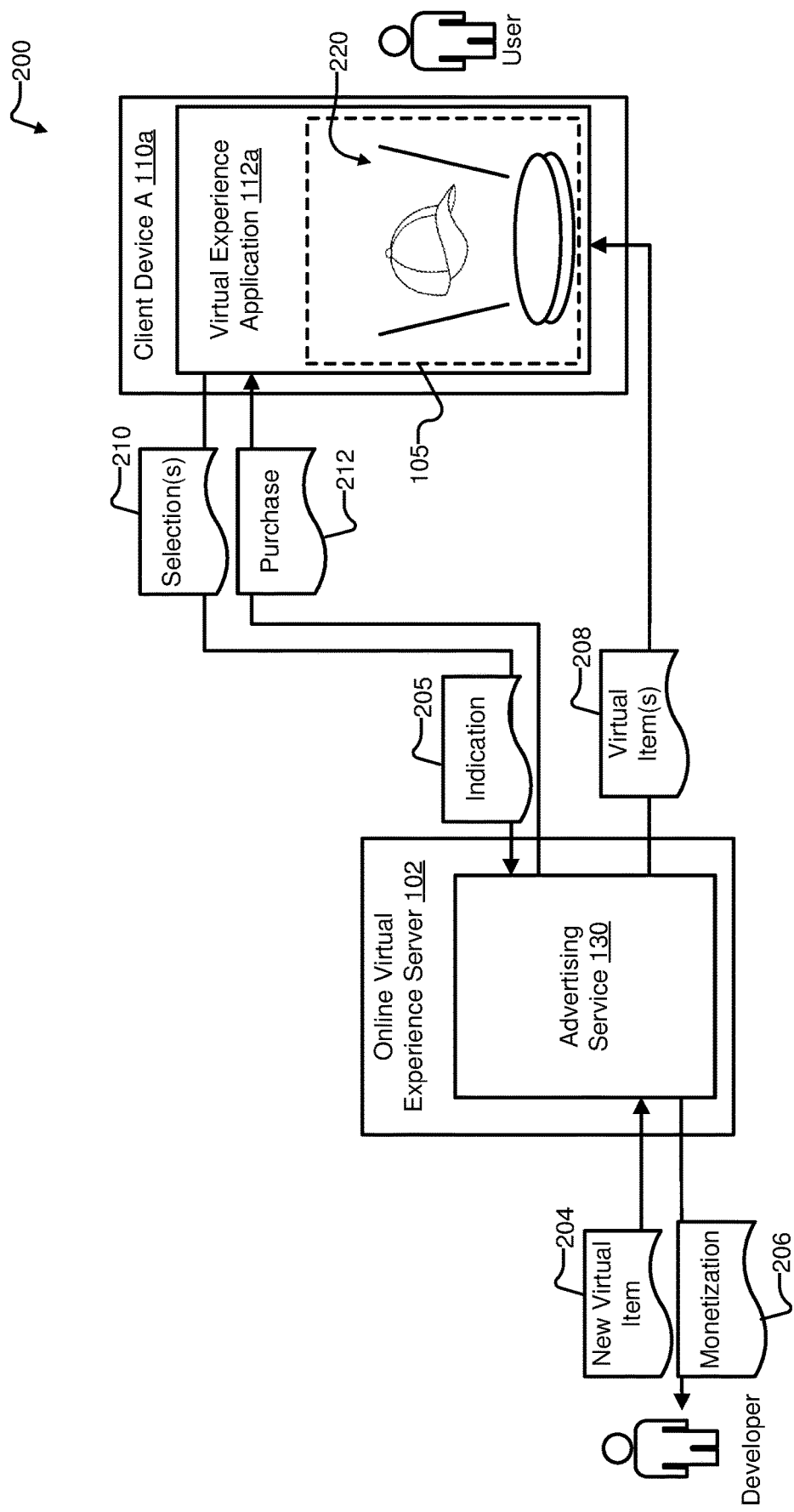
FIG. 2 is a diagram of an example system architecture to implement interactive digital advertisements, in accordance with some implementations.

FIG. 2: Flow Diagram of Interactive Advertising

FIG. 2 is a flow diagram of an example system architecture 200 to provide interactive digital advertising, in accordance with some implementations.

The system architecture 200 (also referred to as a "subsystem" herein) includes the online virtual experience server 102, advertising service 130, and client device 110 executing virtual experience 112. Online virtual experience server 102 and client device 110 may be arranged as described above with reference to FIG. 1, namely, in operative communication over network 122 (not illustrated here for clarity).

In one example, a developer may create a new virtual item 204 for deployment and use in a virtual experience. The new virtual item 204, as well as developer-specified settings for advertising the new virtual item 204, may be input into the advertising service 130. Several developer-specified settings may be used. For example, a creator of the new virtual item 204 may specify an amount of currency they would pay for X number of views, an amount of currency they would pay for Y number of try-ons, an amount of currency for Z number of purchases, and/or if the virtual item should be advertised to a particular type of subscriber, only premium users, or on another basis.

The advertising service 130 may take as input the new virtual item 204 and developer-specified settings for advertising, and create an ad profile for the respective developer and item 204 combination. For example, the developer may indicate one or more settings for advertising based upon any suitable advertising profile. In some implementations, the developer's settings may include configurable keywords that specify which items they do not want the advertising service 130 to display, configurable keywords that specify which items they want the advertising service 130 to display, minimum or maximum age thresholds for advertising, minimum or maximum gameplay hours for advertising, min/max number of items to advertise, radius of "geo-fence" that will trigger the Ad display, min/max number of users in the geo-fence that will trigger the Ad display, and/or other developer advertising settings.

Thereafter, the advertising service may receive indication 205 that a user's avatar is participating in virtual experience 105 through the virtual experience application 112. The indication 205 may include indication that a first avatar associated with a first user identifier (ID) is within a threshold radius of virtual user engagement station 220.

In some implementations, based on the data included in indication 205, the advertising service 130 may select one or more virtual items 208 for presentation as one or more interactive digital advertisements to the avatar. The one or more virtual items 208 may be selected by the advertising service 130 based upon: user data, classification of the items or an associated virtual experience, rating of the items or an associated virtual experience, matching of user settings, and/or other another suitable basis. For example, in some implementations, the selected one or more virtual items 208 may include: types of items in the user's inventory (e.g., items they have previously purchased), types of items the user has tried on when browsing a catalog or search engine, types of items the user has favorited in the catalog or search engine, and other suitable virtual items.

In some implementations, the advertising service may select virtual items 208 based upon data comprising one or more of: a genre of a virtual experience, historical player count, developer specified keywords, developer specified excluded keywords, minimum number of players/avatars to display a virtual user engagement station, type of virtual item, description of virtual item, a count of previous displays of a virtual item, a count of previous "try on" attempts of a virtual item, a count of purchases of a virtual item, a count of views of a virtual item, a number of gameplays of a virtual experience, user inventory item details, user favorited items details, a number of ads viewed by a user, a number of "try on" attempts for a user, and/or a number of purchases made by a user. Other suitable data may also be applicable.

As one example, a Number of "try on" attempts of advertised items by a user indicates the level of engagement of a user with the Ad module and hence a user with a higher "try on" count would be more likely to make a purchase. Alternatively, a function of ads viewed, items tried on and items purchased can also be used as a proxy for indicating the level of engagement of a user. e.g. engagement level= (items tried on/Ads viewed)+items purchased.

As an additional example, "try on" attempts of items in the catalog may indicate the type of items the user is interested in and hence would be an indicator of the types of items to be displayed to the user to increase their engagement with the Ad module.

Other variations based on the above-data are also applicable.

In some implementations, the advertising service 130 may be configured to determine other forms of user data that may be relevant in advertising. For example, in some implementations, the advertising service 130 may consider user interactions with particular forms of virtual items in serving future ads (e.g., if a user shows interest in clothing but never purchases footwear). In some implementations, the advertising service may consider user settings in presenting advertisements (e.g., a user may select settings as to the rate and content of digital ads). In some implementations, the advertising service 130 may select virtual items for advertising based upon contextual data related to one or more of: a type or classification of a virtual experience (e.g., a cooking experience may include items comprising aprons, etc.), an age rating of the virtual experience (e.g., no weapons or loot box ads for some experiences), whether a group of avatars is present (e.g., present group purchases or individual purchases), whether an item is customizable (e.g., if a user typically prefers, or historically has, edited colors, shapes, and other features of purchased items), and other contextual data. Other variations in selection of virtual items for display and interactive digital advertising may be applicable.

Upon interaction by the user's avatar with the virtual user engagement station 220, the user may select one or more items to interact with or purchase. If the avatar has selected (e.g., through selections 210) an item to interact with or "try on," the advertising service 130 may temporarily allow the avatar to appear as if the virtual item is worn. A time limit and/or radius of movement limit may be placed upon the avatar during the "try on" phase. For example, if the avatar has worn the virtual item for a predetermined or selected amount of time, the advertising service 130 may present the avatar with an option to purchase and/or try on a different virtual item. As an additional example, if the avatar moves beyond the threshold radius the advertising service 130 may present the avatar with an option to purchase, or may remove the item as the avatar leaves the proximity of the virtual user engagement station.

If the user issues a selection 210 to purchase a virtual item, the selection 210 is input by the advertising service 130 to effectuate the purchase 212. Thereafter, the avatar may be granted use of the purchased virtual item and the item placed into the associated user ID's inventory. Upon successful purchase, the advertising service 130 may also determine an associated monetization amount 206 to be transferred into the associated developer account. The monetization amount 106 may be in the form of virtual currency, in some implementations.

Hereinafter, example visualizations and configurations of the virtual user engagement station 220 are described in detail below with reference to FIG. 3.

FIG. 3: Virtual User Engagement Station

Figure 3A:
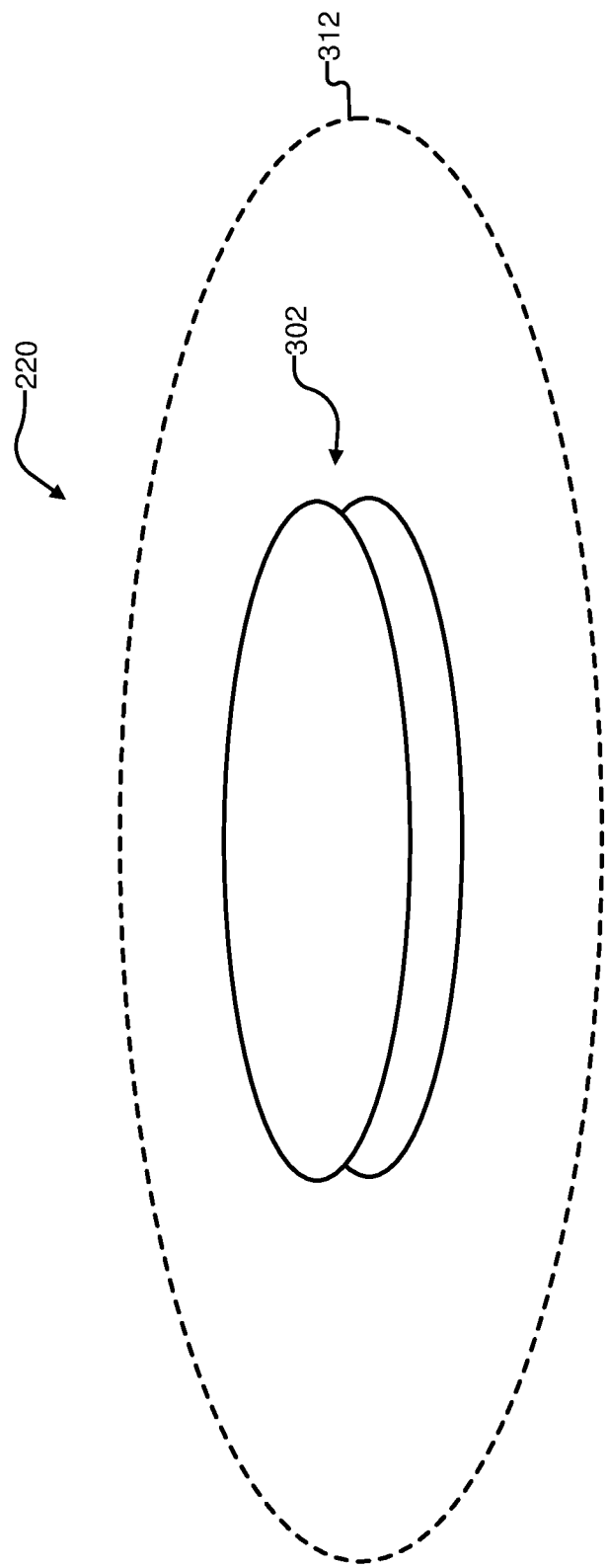
FIG. 3A is a perspective view of a virtual user engagement station in a first configuration, in accordance with some implementations.

FIG. 3A is a perspective view of a virtual user engagement station in a first configuration, in accordance with some implementations. It is noted that the description provided in reference to FIG. 3A is illustrative only, and not limiting. For example, actual appearance of a virtual user engagement station may be varied in many ways. Furthermore, the number, types, and displayed virtual items may be altered in many ways. Moreover, the simplified schematic shown is for illustrative purposes only, and does not encompass all variations which may be applicable to example embodiments.

As shown in FIG. 3A, the virtual user engagement station 220 may comprise a base member 302. The base member may take any shape or suitable format. In this example, a generally circular base member 302 is illustrated, however, a rectangular, domed, frusto-conical, or other suitable shapes are also applicable. The virtual user engagement station may also include a threshold radius 312 defined and associated therewith. The threshold radius 312 is denoted by a dashed line tracing a radius extending radially outward from the base member 302 and into the virtual experience where it is presented. In some implementations, the threshold radius 312 defined an area where an avatar must stand to activate the virtual user engagement station 220. In some implementations, the threshold radius 312 defines an area around the virtual user engagement station in which a use may move about while trying on a virtual item that is advertised. In some implementations, an additional threshold radius may be defined for avatar motion while trying on an item as well as a radius for activation of the virtual user engagement station 220. Furthermore, it should be understood that the threshold radius 312 may not be strictly a circle, but may take any form whereby a user's approach towards the virtual engagement station is used to signal changes and/or advertisements as described herein.

In example embodiments, the virtual user engagement station may be placed anywhere within a virtual experience. The placement and number of virtual user engagement stations may be modified based upon developer settings, user settings, and other suitable parameters, including parameters specified by the virtual experience platform operator.

Figure 3B:
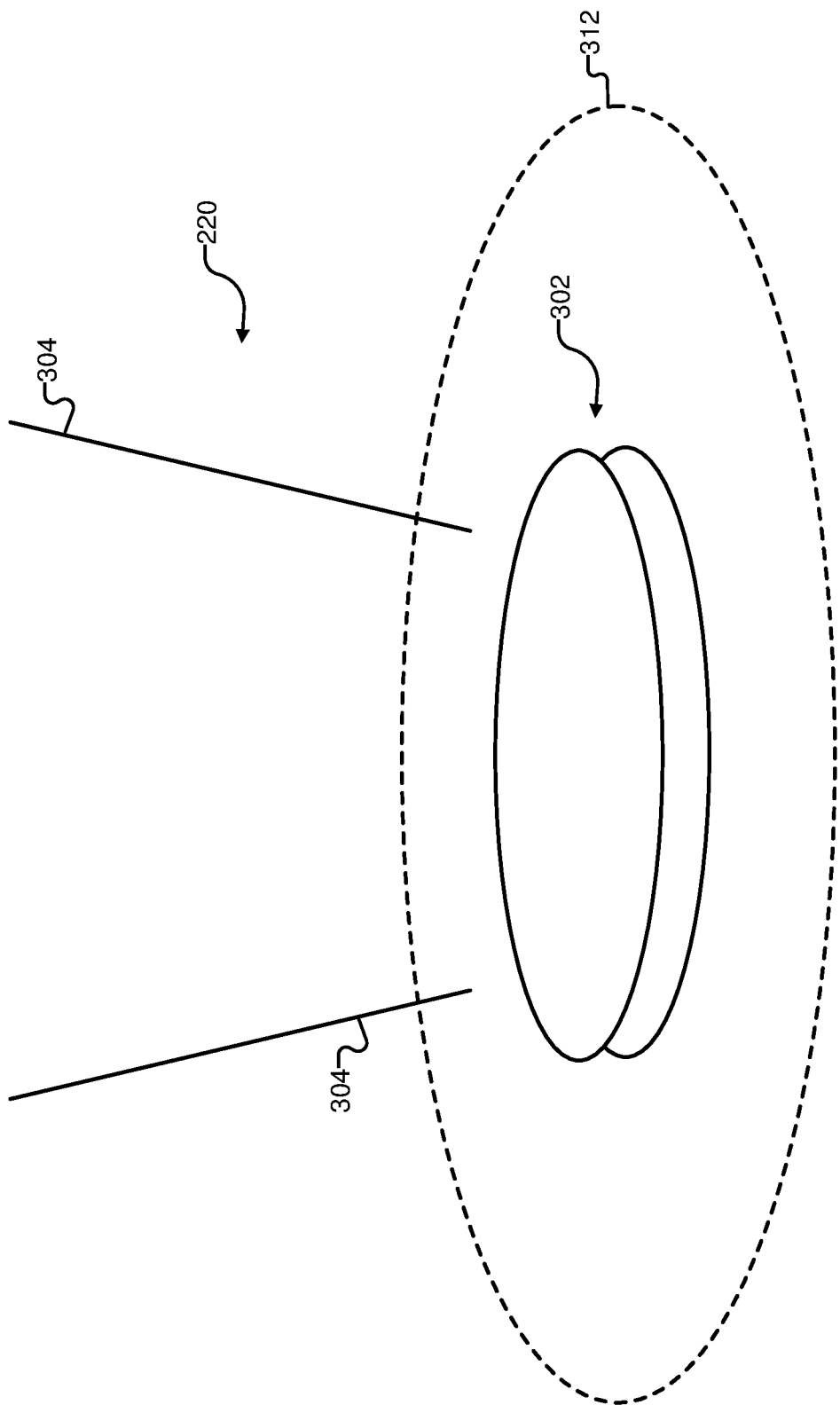
FIG. 3B is a perspective view of a virtual user engagement station in a second configuration, in accordance with some implementations

FIG. 3B is a perspective view of a virtual user engagement station in a second configuration, in accordance with some implementations. It is noted that the description provided in reference to FIG. 3B is illustrative only, and not limiting. For example, actual appearance of a virtual user engagement station may be varied in many ways. Furthermore, the number, types, and displayed virtual items may be altered in many ways. Moreover, the simplified schematic shown is for illustrative purposes only, and does not encompass all variations which may be applicable to example embodiments.

As shown in FIG. 3B, a beacon of light or other appearance changes 304 are rendered in conjunction with the virtual user engagement station 220. For example, if an avatar is within the threshold radius 312, the virtual user engagement station 220 may be rendered as shown in FIG. 3B.

Figure 3C:
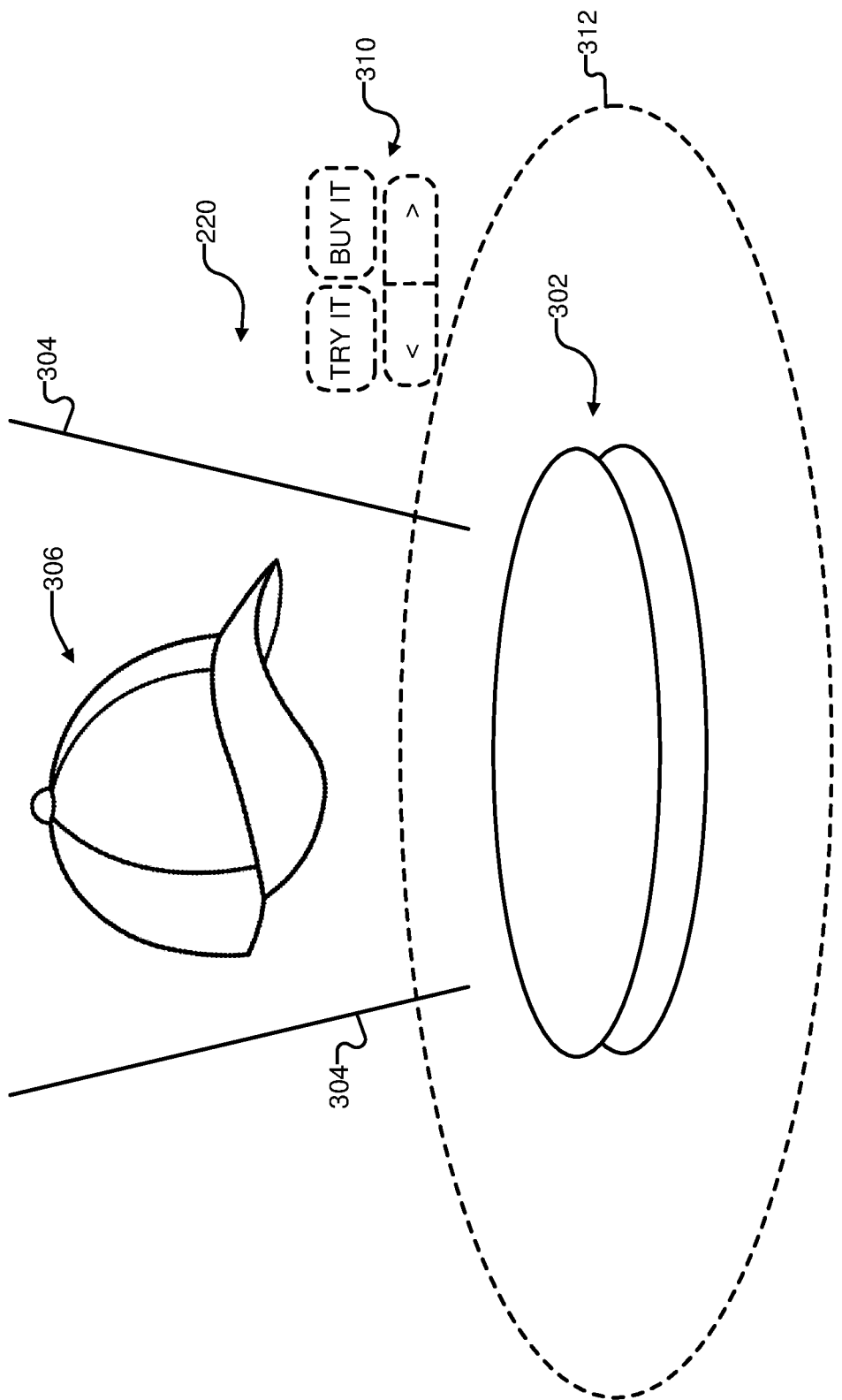
FIG. 3C is a perspective view of a virtual user engagement station in a third configuration, in accordance with some implementations

FIG. 3C is a perspective view of a virtual user engagement station in a third configuration, in accordance with some implementations. It is noted that the description provided in reference to FIG. 3C is illustrative only, and not limiting. For example, actual appearance of a virtual user engagement station may be varied in many ways. Furthermore, the number, types, and displayed virtual items may be altered in many ways. Moreover, the simplified schematic shown is for illustrative purposes only, and does not encompass all variations which may be applicable to example embodiments.

As shown in FIG. 3C, a user ID associated with an avatar that is within the threshold radius 312 has been presented a digital advertisement for a virtual item 306. The virtual item 306 may be presented based upon developer settings, user settings, and user data as described herein.

As further shown in FIG. 3C, user selection options 310 are rendered in conjunction with the virtual user engagement station 220 such that an avatar may select options to "try it," "buy it," and/or display additional or different virtual items. The "try it" option may allow the avatar to appear as if wearing the displayed virtual item temporarily or while within the threshold radius 312. The "buy it" option may allow the purchase of the displayed virtual item as described above with reference to FIG. 2. It is noted that purchase prices, options, and other suitable data may be displayed responsive to an avatar selecting the "buy it" option. The scrolling arrow selections may allow a user to alternate between different virtual items selected by the advertising service 130 (e.g., as shown in FIG. 3D).

Figure 3D:
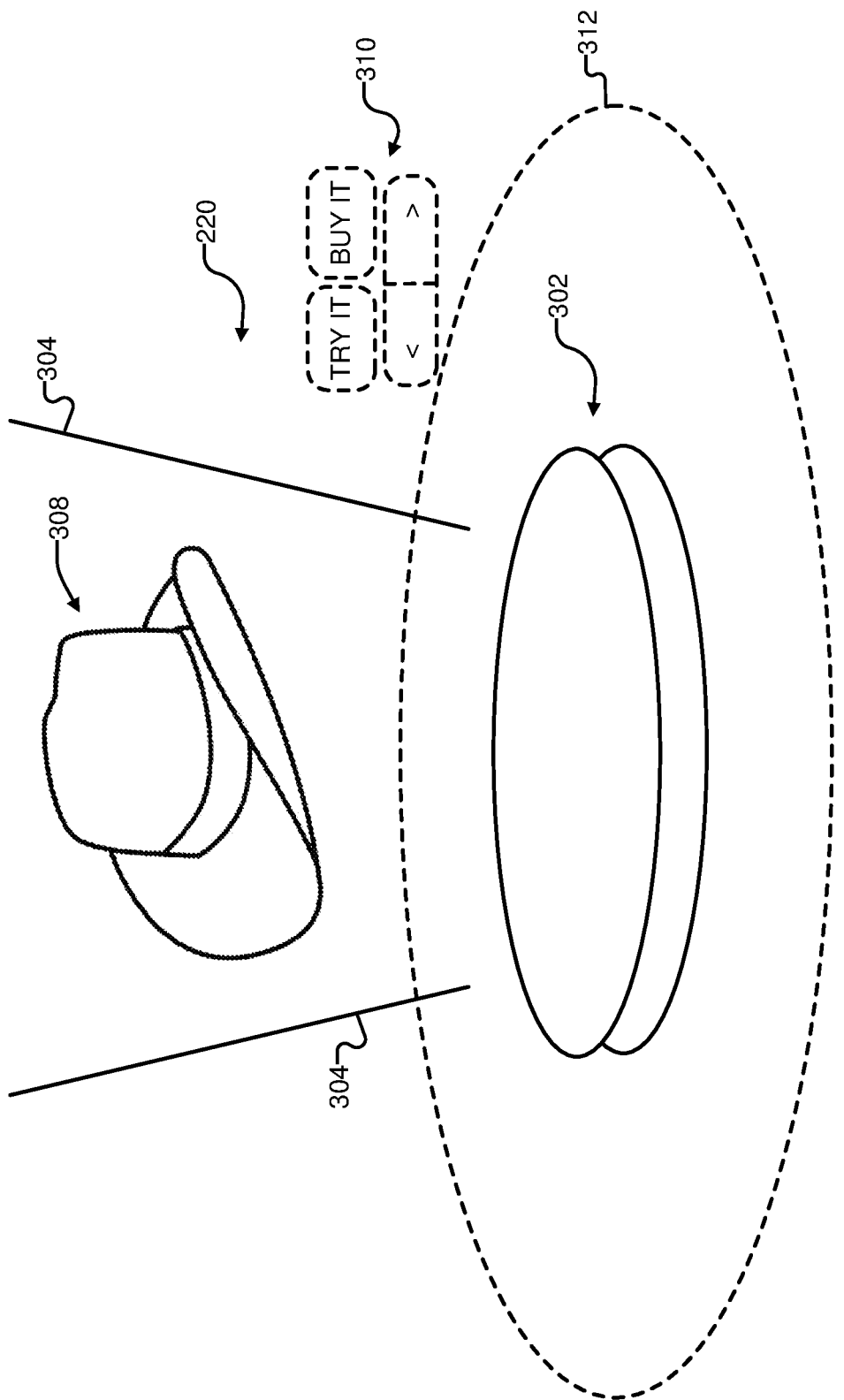
FIG. 3D is a perspective view of a virtual user engagement station in an alternate third configuration, in accordance with some implementations.

FIG. 3D is a perspective view of a virtual user engagement station in an alternate third configuration, in accordance with some implementations. It is noted that the description provided in reference to FIG. 3D is illustrative only, and not limiting. For example, actual appearance of a virtual user engagement station may be varied in many ways. Furthermore, the number, types, and displayed virtual items may be altered in many ways. Moreover, the simplified schematic shown is for illustrative purposes only, and does not encompass all variations which may be applicable to example embodiments.

As shown in FIG. 3D, an avatar has selected an option to display a different virtual item, virtual item 308, instead of virtual item 306. As further shown, selection options 310 are also rendered such that the avatar may interact with the virtual user engagement station 220 and the virtual item 308 as described above.

Hereinafter, methods of interactive digital advertising are described in detail with reference to FIG. 4 and FIG. 5.

Figure 4:
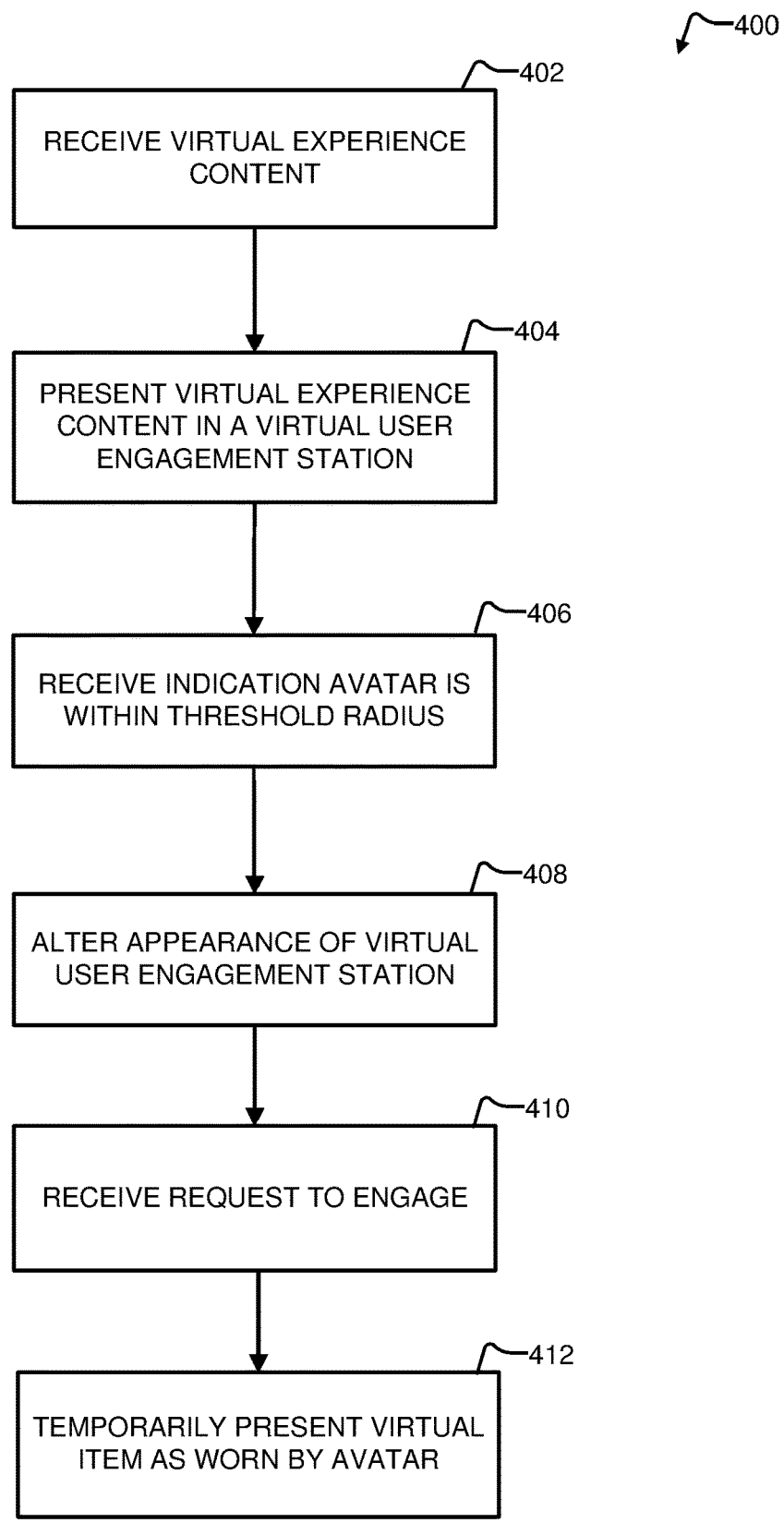
FIG. 4 is a flowchart of an example method of interactive digital advertising, in accordance with some implementations.

FIG. 4: Method of Interactive Digital Advertising

FIG. 4 is a flowchart of an example method of interactive digital advertising, in accordance with some implementations.

In some implementations, method 400 can be implemented, for example, on a server 102 described with reference to FIG. 1 and FIG. 2. In some implementations, some or all of the method 400 can be implemented on one or more client devices 110 as shown in FIG. 1, on one or more developer devices (not illustrated), or on one or more server device(s) 102, and/or on a combination of developer device(s), server device(s) and client device(s). In described examples, the implementing system includes one or more digital processors or processing circuitry ("processors"), and one or more storage devices (e.g., a data store 108 or other storage). In some implementations, different components of one or more servers and/or clients can perform different blocks or other parts of the method 400. In some examples, a first device is described as performing blocks of method 400. Some implementations can have one or more blocks of method 400 performed by one or more other devices (e.g., other client devices or server devices) that can send results or data to the first device.

In some implementations, the method 400, or portions of the method, can be initiated automatically by a system. In some implementations, the implementing system is a first device. For example, the method (or portions thereof) can be periodically performed, or performed based on one or more particular events or conditions, e.g., a time since last advertisement exceeding a threshold, a number of "try on" attempts exceeding a threshold, a predetermined time period having expired since the last performance of method 400 for a particular virtual item or user, and/or one or more other conditions occurring which can be specified in settings read by the method.

Method 400 may begin at block 402. At block 402, virtual experience content associated with a virtual experience is received by, for example, advertising service 130. The received virtual experience content may include at least one virtual item that is useable to alter an appearance of an avatar within the virtual experience. For example, the at least one virtual item may include clothing, accessories, tools, weapons, garments, hats, footwear, or other item that may be worn by an avatar. The at least one virtual item may also be associated with developer settings for a respective developer that created the at least one virtual item. Block 402 is followed by block 404.

At block 404, the received virtual experience content is presented within the virtual experience in a virtual user engagement station (e.g., see FIGS. 3A-3D). The virtual user engagement station may include a base virtual member of any shape that is configured to display the at least one virtual item. The virtual user engagement station and/or the virtual base member may also have a threshold radius defined from the base virtual member extending radially outward within the virtual environment or the virtual experience. For example, dotted line 312 denotes a traced threshold radius. In some implementations, more than one radius may be defined, with each radius being operative to control temporary "trying on" or virtual items, movement with a virtual item tried on, activation of one or more configurations of the virtual user engagement station, and so on. In these and other examples, a first radius may define a "advertise product" radius, a second radius may define a "allow to try on" radius," and a third radius may define a "other activity" radius. Other radii may also be applicable in some implementations.

Placement of the virtual engagement station may be based upon developer specified settings of the developer of the virtual experience. However, a total number of engagement stations may be configurable by an operator of the online virtual experience platform. The limit can be set by the online virtual experience platform based on, but not limited to, a constant limit (e.g., 4 stations), number of game plays of the experience (e.g., game plays within specified ranges might grant the virtual experience developer one or more stations per range, to reward highly engaging virtual experiences with the ability to use more engagement stations), and/or to limit overlap of threshold radiuses and hence will dictate placement and number of engagement stations.

Block 404 is followed by block 406.

At block 406, an indication that a first avatar is within the threshold radius is received. The first avatar may be associated with a first user and a first user identifier (ID). The first user ID may be input by the advertising service 130 to determine and select a suitable virtual item (or multiple virtual items) to present with the virtual user engagement station. Block 406 is followed by block 408.

At block 408, an appearance of the virtual engagement station is altered. For example, the appearance of the virtual engagement station may be altered to emit a beam of light or other highlighting features to grab the attention of the user. The appearance may also be altered in other forms, such as any of the configurations illustrated in FIGS. 3A-3D, or in additional forms such as by altering: a color, a shape, a size, and/or other parameters, of the virtual user engagement station and/or virtual base member. Block 408 is followed by block 410.

At block 410, a request to engage with the at least one virtual item may be received. For example, the advertising service 130 may receive the request to engage or the virtual experience server 102 or another portion thereof may receive the request to engage. The request to engage may be effectuated by the avatar approaching the virtual item, grasping the virtual item, selecting engagement options (e.g., "try it," "buy it," etc.), or through another form of indication. Block 410 is followed by block 412.

At block 412, the at least one virtual item is temporarily presented as being worn or used by the avatar. For example, if the virtual item is clothing or an accessory, the avatar may be rendered for display as though wearing the clothing or accessory. Similarly, a tool or weapon may also be presented as being worn or grasped by the avatar. Other variations are also applicable.

It is noted that the avatar may continue to engage with the virtual user engagement station by selecting different items to "try" or "buy," or by simply approaching different virtual user engagement stations. Furthermore, in some implementations, multiple virtual items may be tried on in sequence or in parallel, without departing from the scope of this disclosure.

Blocks 402-412 can be performed (or repeated) in a different order than described above and/or one or more blocks can be omitted. Method 400 can be performed on a server (e.g., 102) and/or a client device (e.g., 110). Furthermore, portions of the method 400 may be combined and performed in sequence or in parallel, according to any desired implementation.

Figure 5:
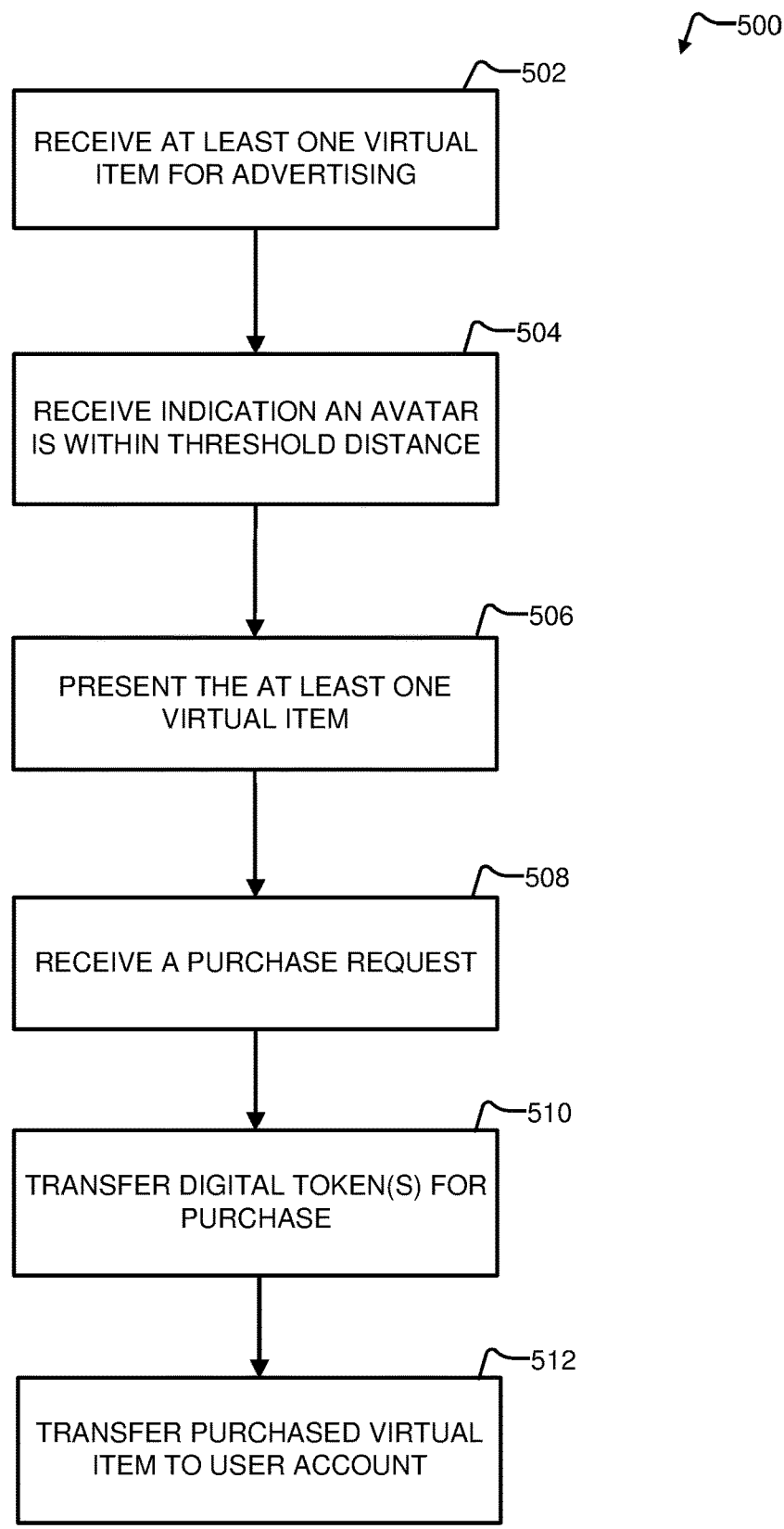
FIG. 5 is a flowchart of another example method of interactive digital advertising with purchasing, in accordance with some implementations.

FIG. 5: Method of Interactive Digital Advertising with Purchasing

FIG. 5 is a flowchart of an example method of interactive digital advertising with purchasing, in accordance with some implementations.

In some implementations, method 500 can be implemented, for example, on a server 102 described with reference to FIG. 1 and FIG. 2. In some implementations, some or all of the method 500 can be implemented on one or more client devices 110 as shown in FIG. 1, on one or more developer devices (not illustrated), or on one or more server device(s) 102, and/or on a combination of developer device(s), server device(s) and client device(s). In described examples, the implementing system includes one or more digital processors or processing circuitry ("processors"), and one or more storage devices (e.g., a data store 108 or other storage). In some implementations, different components of one or more servers and/or clients can perform different blocks or other parts of the method 500. In some examples, a first device is described as performing blocks of method 500. Some implementations can have one or more blocks of method 500 performed by one or more other devices (e.g., other client devices or server devices) that can send results or data to the first device.

In some implementations, the method 500, or portions of the method, can be initiated automatically by a system. In some implementations, the implementing system is a first device. For example, the method (or portions thereof) can be periodically performed, or performed based on one or more particular events or conditions, e.g., a time since last advertisement exceeding a threshold, a number of "try on" attempts exceeding a threshold, a predetermined time period having expired since the last performance of method 500 for a particular virtual item or user, and/or one or more other conditions occurring which can be specified in settings read by the method.

Method 500 may begin at block 502. At block 502, at least one virtual item that is useable to alter an appearance of an avatar within a virtual experience is received. For example, the at least one virtual item may include clothing, accessories, tools, weapons, garments, hats, footwear, or other suitable content. The at least one virtual item may also be associated with developer settings for a respective developer that created the at least one virtual item. Block 502 is followed by block 504.

At block 504, an indication that a first avatar is within a threshold radius of a virtual user engagement station is received. The first avatar may be associated with a first user and a first user identifier (ID). The first user ID may be input into the advertising service 130 to determine and select a suitable virtual item (or multiple virtual items) to present with the virtual user engagement station. Block 504 is followed by block 506.

At block 506, the at least one virtual item is presented at the virtual user engagement station. For example, the virtual item may be rendered as hovering over or rotating above a virtual base member of the virtual user engagement station. Block 506 is followed by block 508.

At block 508, a request to purchase the at least one virtual item may be received. For example, the advertising service 130 may receive the request to purchase or the virtual experience server 102 or another portion thereof may receive the request to purchase. The request to engage may be effectuated by the avatar approaching and grasping the virtual item, and the user associated with the avatar selecting a purchase option (e.g., "buy it"), or through another form of indication. Block 508 is followed by block 510.

At block 510, digital tokens for the purchase are transferred between the user, the virtual experience platform, and/or the developer. For example, virtual currency in an amount of a purchase price for the virtual item may be transferred to the associated developer account. For example, virtual currency in the amount of transfer may also be removed from the associated user account. The virtual currency transfer may also be varied according to any associated regulations on virtual transactions associated with the developer, user, and/or virtual experience platform. Block 510 is followed by block 512.

At block 512, the at least one virtual item is transferred to a user's inventory or user account. In some implementations, the avatar may continue to wear the recently purchased item and/or continue to engage with the virtual user engagement station.

It is noted that aspects of both of methods 400 and 500 may be combined to form alternative methods where "trying" and "buying" of virtual items are performed in different manners than those particularly illustrated and described. Furthermore, blocks 502-512 can be performed (or repeated) in a different order than described above and/or one or more blocks can be omitted. Method 500 can be performed on a server (e.g., 102) and/or a client device (e.g., 110). Furthermore, portions of the method 500 may be combined and performed in sequence or in parallel, according to any desired implementation.

Hereinafter, a more detailed description of various computing devices that may be used to implement different devices and/or components illustrated in FIGS. 1-2 is provided with reference to FIG. 6.

Figure 6:
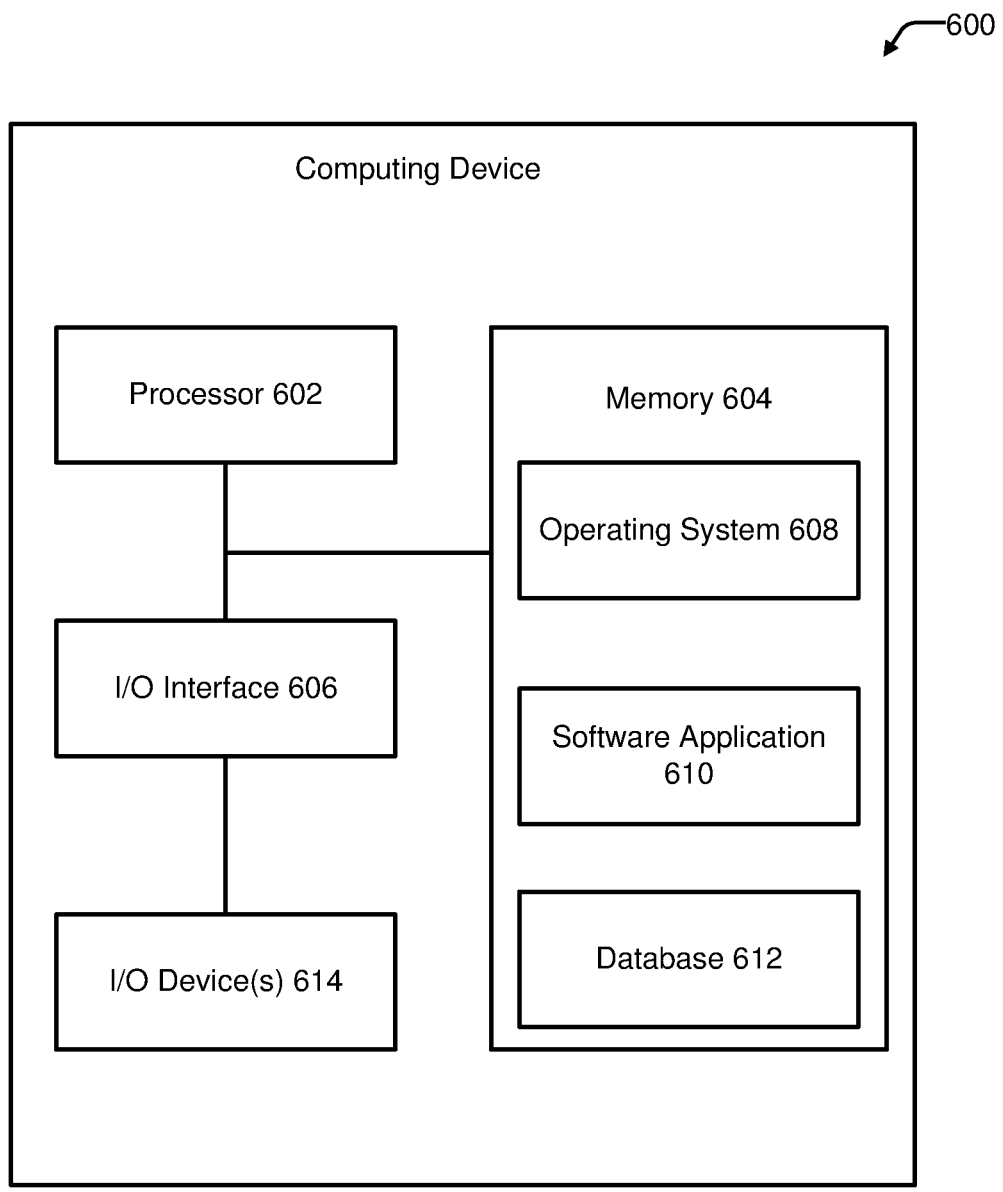
FIG. 6 is a block diagram illustrating an example computing device, in accordance with some implementations.

FIG. 6 is a block diagram of an example computing device 600 which may be used to implement one or more features described herein, in accordance with some implementations. In one example, device 600 may be used to implement a computer device, (e.g., 102, 110 of FIG. 1 and FIG. 2), and perform appropriate operations as described herein. Computing device 600 can be any suitable computer system, server, or other electronic or hardware device. For example, the computing device 600 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 600 includes a processor 602, a memory 604, input/output (I/O) interface 606, and audio/video input/output devices 614 (e.g., display screen, touchscreen, display goggles or glasses, audio speakers, headphones, microphone, etc.).

Processor 602 can be one or more processors and/or processing circuits to execute program code and control basic operations of the device 600. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 604 is typically provided in device 600 for access by the processor 602, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 602 and/or integrated therewith. Memory 604 can store software operating on the server device 600 by the processor 602, including an operating system 608, software application 610 and associated data 612. In some implementations, the applications 610 can include instructions that enable processor 602 to perform the functions described herein, e.g., some or all of the method of FIG. 4 or FIG. 5. Software application 610 may include some or all of the functionality required to present interactive digital advertisements. In some implementations, one or more portions of software application 610 may be implemented in dedicated hardware such as an application-specific integrated circuit (ASIC), a programmable logic device (PLD), a field-programmable gate array (FPGA), a machine learning processor, etc. In some implementations, one or more portions of software application 610 may be implemented in general purpose processors, such as a central processing unit (CPU) or a graphics processing unit (GPU). In various implementations, suitable combinations of dedicated and/or general purpose processing hardware may be used to implement software application 610.

For example, software application 610 stored in memory 604 can include instructions for retrieving user data, for displaying/presenting interactive digital advertisements, and/or other functionality or software such as the advertising service 130, VE Engine 104, and/or VE Application 112. Any of software in memory 604 can alternatively be stored on any other suitable storage location or computer-readable medium. In addition, memory 604 (and/or other connected storage device(s)) can store instructions and data used in the features described herein. Memory 604 and any other type of storage (magnetic disk, optical disk, magnetic tape, or other tangible media) can be considered "storage" or "storage devices."

I/O interface 606 can provide functions to enable interfacing the server device 600 with other systems and devices. For example, network communication devices, storage devices (e.g., memory and/or data store 106), and input/output devices can communicate via interface 606. In some implementations, the I/O interface can connect to interface devices including input devices (keyboard, pointing device, touchscreen, microphone, camera, scanner, etc.) and/or output devices (display device, speaker devices, printer, motor, etc.).

For ease of illustration, FIG. 6 shows one block for each of processor 602, memory 604, I/O interface 606, software blocks 608 and 610, and database 612. These blocks may represent one or more processors or processing circuitries, operating systems, memories, I/O interfaces, applications, and/or software modules. In other implementations, device 600 may not have all of the components shown and/or may have other elements including other types of elements instead of, or in addition to, those shown herein. While the online server 102 are described as performing operations as described in some implementations herein, any suitable component or combination of components of online server 102, or similar system, or any suitable processor or processors associated with such a system, may perform the operations described.

A user device can also implement and/or be used with features described herein. Example user devices can be computer devices including some similar components as the device 600, e.g., processor(s) 602, memory 604, and I/O interface 606. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 614, for example, can be connected to (or included in) the device 600 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more client devices. In some implementations, one or more methods described herein can be implemented, for example, on a server system, and/or on both a server system and a client system. In some implementations, different components of one or more servers and/or clients can perform different blocks, operations, or other parts of the methods.

One or more methods described herein (e.g., method 400 or 500) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") executing on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the live feedback data for output (e.g., for display). In another example, computations can be split between the mobile computing device and one or more server devices.

In situations in which certain implementations discussed herein may obtain or use user data (e.g., user demographics, user behavioral data, user contextual data, user settings for advertising, etc.) users are provided with options to control whether and how such information is collected, stored, or used. That is, the implementations discussed herein collect, store and/or use user information upon receiving explicit user authorization and in compliance with applicable regulations.

Users are provided with control over whether programs or features collect user information about that particular user or other users relevant to the program or feature. Each user for which information is to be collected is presented with options (e.g., via a user interface) to allow the user to exert control over the information collection relevant to that user, to provide permission or authorization as to whether the information is collected and as to which portions of the information are to be collected. In addition, certain data may be modified in one or more ways before storage or use, such that personally identifiable information is removed. As one example, a user's identity may be modified (e.g., by substitution using a pseudonym, numeric value, etc.) so that no personally identifiable information can be determined. In another example, a user's geographic location may be generalized to a larger region (e.g., city, zip code, state, country, etc.).

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method of digital advertising within a virtual experience provided by a virtual experience platform, the method comprising:
   receiving virtual experience content associated with a virtual experience, the received virtual experience content including at least one virtual item that is useable to alter an appearance of an avatar within the virtual experience;
   presenting the received virtual experience content within the virtual experience in a virtual user engagement station, wherein the virtual user engagement station is displayed within the virtual experience, and wherein the virtual user engagement station includes a base virtual member configured to display the at least one virtual item and a threshold radius defined from the base virtual member extending radially outward within the virtual experience;
   receiving indication that a first avatar associated with a first user identifier (ID) is within the threshold radius;
   altering an appearance of the virtual user engagement station responsive to the received indication;
   after the altering, receiving a request from the first user ID to engage with the at least one virtual item;
   responsive to receiving the request, displaying the at least one virtual item as being worn by the first avatar associated with the first user ID;
   receiving second indication that the first avatar is beyond the threshold radius; and
   responsive to the second indication, displaying the first avatar and the at least one virtual item as being removed from being worn by the first avatar.

2. The computer-implemented method of claim 1, wherein presenting the received virtual experience content comprises:
   selecting a virtual item from the received virtual experience content as the at least one virtual item based upon a classification, a rating, or subject matter of the virtual experience.

3. The computer-implemented method of claim 1, wherein presenting the received virtual experience content comprises:
   selecting a virtual item from the received virtual experience content as the at least one virtual item based upon user data associated with the first user ID.

4. The computer-implemented method of claim 1, wherein the received virtual experience content is associated with a second user ID of the virtual experience platform, the method further comprising:
   after displaying the at least one virtual item as being worn by the first avatar, receiving a purchase request from the first user ID for the at least one virtual item; and
   in response to receiving the purchase request, transferring a digital token from a first digital wallet associated with the first user ID to a second digital wallet associated with the second user ID.

5. The computer-implemented method of claim 4, wherein the digital token is a digital representation of a virtual currency amount associated with the at least one virtual item, and wherein the virtual currency amount is shown during the displaying the received virtual experience content.

6. The computer-implemented method of claim 1, wherein the virtual user engagement station comprises at least two configurations, wherein a first configuration comprises a beacon emanating from the base virtual member, and wherein a second configuration is the altered appearance.

7. The computer-implemented method of claim 1, wherein displaying the at least one virtual item comprises:
   temporarily displaying the at least one virtual item as being worn by the first avatar associated with the first user ID for a time frame that is dependent upon defined settings.

8. The computer-implemented method of claim 7, wherein the temporarily presenting comprises displaying at least a portion of the at least one virtual item on the first avatar for one or more of: a predetermined amount of time, or until the first avatar is beyond the threshold radius from the virtual user engagement station.

9. The computer-implemented method of claim 1, wherein the at least one virtual item is a first virtual item of a plurality of virtual items, and wherein displaying the received virtual experience content comprises:
   presenting one virtual item of the plurality of virtual items above the virtual base member;

presenting a selection option proximate to the virtual base member; and responsive to the first avatar engaging with the selection option, presenting a different virtual item of the plurality of virtual items above the virtual base member.

10. The computer-implemented method of claim 9, further comprising:

receiving a second request to engage with the different virtual item; and altering the appearance of the first avatar with the different virtual item responsive to receiving the second request.

11. The computer-implemented method of claim 1, wherein the at least one virtual item is a first virtual item of a plurality of virtual items, and wherein displaying the received virtual experience content comprises:

presenting at least one virtual item of the plurality of virtual items above the virtual base member for interaction with the first avatar.

12. The computer-implemented method of claim 1, wherein altering the appearance of the virtual base member comprises one or more of: highlighting the at least one virtual item, highlighting the virtual base member, or displaying the at least one virtual item at the virtual user engagement station.

13. The computer-implemented method of claim 1, wherein receiving the request to engage with the at least one virtual item comprises receiving a selection from a selectable option displayed proximate to the virtual base member.

14. The computer-implemented method of claim 1, wherein the at least one virtual item is a piece of virtual clothing, and wherein the displaying comprises displaying the piece of virtual clothing as worn by the first virtual avatar.

15. The computer-implemented method of claim 1, wherein the at least one virtual item is: a piece of clothing, a clothing accessory, a neck accessory, a wrist accessory, or shoes.

16. A non-transitory computer-readable medium with instructions stored thereon that, responsive to execution by a processing device, causes the processing device to perform operations comprising:

receiving virtual experience content associated with a virtual experience, the received virtual experience content including at least one virtual item that is useable to alter an appearance of an avatar within the virtual experience;

presenting the received virtual experience content within the virtual experience in a virtual user engagement station, wherein the virtual user engagement station is displayed within the virtual experience, and wherein the virtual user engagement station includes a base virtual member configured to display the at least one virtual item and a threshold radius defined from the base virtual member extending radially outward within the virtual experience;

receiving indication that a first avatar associated with a first user identifier (ID) is within the threshold radius;

altering an appearance of the virtual user engagement station responsive to the received indication;

receiving a request to engage with the at least one virtual item responsive to altering the appearance;

temporarily presenting the at least one virtual item as being worn by the first avatar associated with the first user ID responsive to receiving the request;

receiving second indication that the first avatar is beyond the threshold radius; and responsive to the second indication, displaying the first avatar and the at least one virtual item as being removed from being worn by the first avatar.

17. The non-transitory computer-readable medium of claim 16, wherein presenting the received virtual experience content comprises:

automatically selecting a virtual item from the received virtual experience content as the at least one virtual item based upon a classification, a rating, or subject matter of the virtual experience.

18. The non-transitory computer-readable medium of claim 16, wherein presenting the received virtual experience content comprises:

automatically selecting a virtual item from the received virtual experience content as the at least one virtual item based upon user data associated with the first user ID.

19. The non-transitory computer-readable medium of claim 16, wherein the received virtual experience content is associated with a second user ID, the method further comprising:

receiving a purchase request for the at least one virtual item responsive to the temporarily presenting; and in response to the purchase request, transferring a digital token from a first digital wallet associated with the first user ID to a second digital wallet associated with the second user ID.

20. A system, comprising:

a memory with instructions stored thereon; and a processing device, coupled to the memory and operable to access the memory, wherein the instructions when executed by the processing device, cause the processing device to perform operations including:

receiving virtual experience content associated with a virtual experience, the received virtual experience content including at least one virtual item that is useable to alter an appearance of an avatar within the virtual experience;

presenting the received virtual experience content within the virtual experience in a virtual user engagement station, wherein the virtual user engagement station is displayed within the virtual experience, and wherein the virtual user engagement station includes a base virtual member configured to display the at least one virtual item and a threshold radius defined from the base virtual member extending radially outward within the virtual experience;

receiving indication that a first avatar associated with a first user identifier (ID) is within the threshold radius;

altering an appearance of the virtual user engagement station responsive to the received indication;

receiving a request to engage with the at least one virtual item responsive to altering the appearance;

temporarily presenting the at least one virtual item as being worn by the first avatar associated with the first user ID responsive to receiving the request;

receiving second indication that the first avatar is beyond the threshold radius; and responsive to the second indication, displaying the first avatar and the at least one virtual item as being removed from being worn by the first avatar.

* * * * *

UNITED STATES PATENT AND TRADEMARK OFFICE
CERTIFICATE OF CORRECTION

| | | |
|---|---|---|
| PATENT NO. | : 12,243,179 B2 | Page 1 of 1 |
| APPLICATION NO. | : 17/865746 | |
| DATED | : March 4, 2025 | |
| INVENTOR(S) | : Chokshi | |

It is certified that error appears in the above-identified patent and that said Letters Patent is hereby corrected as shown below:

In the Claims

Column 21, Lines 32 and 33, Claim 14, please delete "first virtual avatar." and insert -- first avatar. -- therefor.

Signed and Sealed this
Second Day of September, 2025

Coke Morgan Stewart
*Acting Director of the United States Patent and Trademark Office*